H. C. MORROW.
GAS ENGINE RECORDER.
APPLICATION FILED MAY 12, 1915.
1,161,875.
Patented Nov. 30, 1915.
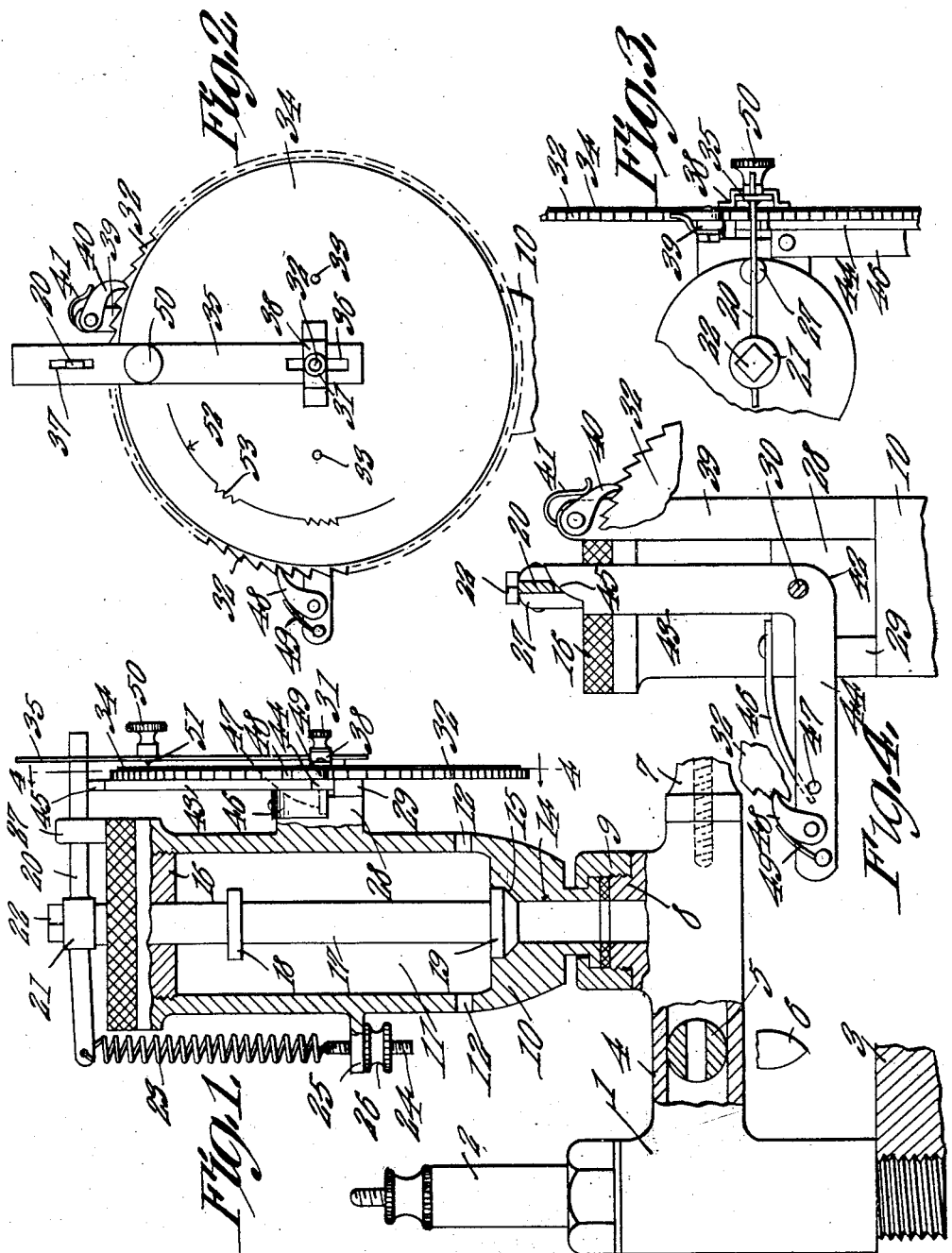

UNITED STATES PATENT OFFICE.

HORACE C. MORROW, OF WELLSTON, OHIO, ASSIGNOR TO WILLIAM T. MORROW, OF WELLSTON, OHIO.

GAS-ENGINE RECORDER.

1,161,875.  Specification of Letters Patent.  Patented Nov. 30, 1915.

Application filed May 12, 1915. Serial No. 27,640.

*To all whom it may concern:*

Be it known that I, HORACE C. MORROW, a citizen of the United States, residing at Wellston, in the county of Jackson and State of Ohio, have invented a new and useful Gas-Engine Recorder, of which the following is a specification.

The device forming the subject matter of this application is adapted to be employed in connection with the cylinders of a multiple cylinder internal combustion engine, for the purpose of segregating any cylinder which is not exercising its function properly or to be employed in connection with a single cylinder engine to obtain a graphic record of imperfections, so far as missed explosions are concerned.

The primary object of the invention is to provide a structure of the sort above mentioned which will operate by pressure, as distinguished from one which is operated by means of a mechanical movement of some sort.

The invention aims to provide a device, the record carrying member of which will be moved continuously by an explosion when an explosion occurs and by cylinder compression when no explosion occurs, the construction, however, being such that a different marking will be made upon the record when an explosion occurs, from that made when the record carrying member is actuated by cylinder compression alone.

The invention aims to improve the means whereby the record carrying member is rotated or moved, and to provide novel means whereby the stylus which coöperates with the record carrying member is actuated.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing: Figure 1 shows the invention in vertical section, parts appearing in elevation; Fig. 2 is a fragmental front elevation, parts being broken away; Fig. 3 is a top plan; Fig. 4 is a section taken on the line 4—4 of Fig. 1.

In the accompanying drawings, the numeral 1 indicates a socket held by a spark plug 2 to an engine cylinder 3, the socket 1 being provided with a laterally extended tubular arm 4 in which is located a cut off valve 5 actuated by a lever 6 or in any other suitable manner. The tubular arm 4 may terminate in a handle 7 of any desired length, whereby the structure may be operated to assemble it with the cylinder 3. Extended from the arm 4 is a neck 8 united by a coupling 9 with a tubular casing 10 embodying a chamber 11 and having exhaust ports 12. The casing 10 is provided with a bore 14 terminating at its upper end in a valve seat 15. The upper end of the casing 10 is closed by means of a cap 16 which may be threaded in place or otherwise secured.

Mounted to reciprocate in the cap 16 is a plunger 17 having a stop 18 adapted to coöperate with the cap as the plunger moves upwardly, the plunger being equipped at its lower end with a valve 19 adapted to coöperate with the seat 15.

Disposed transversely of the plunger 17 and located on the outside of the casing 10 is a transverse arm 20 which may be provided intermediate its ends with a socket 21, receiving the upper end of the plunger 17, the arm 20 being held in place by means of a nut or screw 22 mounted on the upper end of the plunger 17. Secured to one end of the arm 20 is a retractile spring 23 attached at its lower end to a screw 24 passing loosely through the ear 25 disposed on the casing 10, there being a nut 26 threaded onto the lower end of the screw and coöperating with the ear for the purpose of adjusting the tension of the spring 23. The cap 16 of the casing is provided with an upstanding slotted guide 27 in which the arm 20 moves vertically.

Projecting transversely from one side of the casing 10 is a lug 28 having an offset 29. A stud 30 projects from the lug 28 and journaled on the stud 30 is a ratchet wheel 32 retained for rotation on the stud 30 by means of a nut 31 threaded onto the stud. Projecting from the ratchet wheel 32 are fingers 33 passing through a disk 34 (which may be a piece of cardboard) for the purpose of holding the disk 34 on the ratchet wheel 32 to rotate therewith.

The invention comprises a stylus carrier 35 in the form of a bar, the stylus carrier being provided adjacent its lower end with a slot 36 through which the stud 30 passes, to the end that the stylus carrier may move vertically upon the stud. Adjacent its upper end, the stylus carrier 35 is supplied with a slot 37 in which the arm 20 is mounted to move vertically. A retainer 38 straddles the stylus carrier 35 and the ends of the retainer 38 bear on the disk 34, to aid in holding the same engaged with the ratchet wheel 32.

Fixed to and upstanding from the lug 28 is an arm 39 carrying a back stop pawl 40 adapted to coact with the ratchet wheel 32 and constrained to exercise such a function, by means of a spring 41. Mounted to swing on the stud 30 to the rear of the ratchet wheel 32 is an angle lever 42 comprising an arm 43 and an arm 44. The arm 43 is provided at its upper end with a cam 45 adapted to coact with the arm 20. A spring 46 is secured to the lug 28 and bears on a projection 47 on the arm 44, to maintain the arm 43 of the angle lever 42 spaced apart from the member 39. Pivoted to the arm 44 of the angle lever 42 is an actuating pawl 48 held in an operative position by means of a spring 49. Mounted in the stylus carrier 35 is an adjustable stylus holder 50 carrying a stylus 51 adapted to coöperate with the disk 34.

When the device is actuated by a compression in the cylinder 3, the operation is as follows:—The compression in the cylinder 3 causes the plunger 17 to rise, this rising movement of the plunger 17 being limited by adjusting the spring 23 through the medium of the nut 26. When the arm 20 rises along with the plunger 17 and subsequently descends, the arm 20 engages the cam 45 on the arm 43 of the angle lever 42 and the arm 43 comes into abutment with the part 39. When the angle lever 42 is tilted by the downward movement of the part 20 in the manner hereinbefore described, the actuating pawl 48 on the arm 44 of the angle lever 42 engages the ratchet wheel 32 and advances the same through a distance represented by one tooth. When the arm 20 moves vertically, in the manner hereinbefore described, due to compression in the cylinder, the stylus carrier 35 is not elevated, because the arm 20 moves in the slot 37 of the stylus carrier and because the movement of the arm 20 is limited by the action of the spring 23. Thus, when the ratchet wheel 32 and the disk 34 are rotated as above described, the stylus 50 will mark on the disk 34 a portion of a circle, as indicated at 52. If an explosion occurs, the upward movement of the plunger 17 is much more marked, such upward movement being limited by the coaction between the stop 18 and the cap 16. The arm 20 moving upwardly, arrives at the upper end of the slot 37 in the stylus carrier 35 and elevates the stylus carrier, the slot 36 in the stylus carrier permitting the same to move upwardly with respect to the stud 30. Under the impulse of an explosion, therefore, the stylus 51 causes a notch or tooth to be made in the marking on the disk 34 as indicated at 53.

From the foregoing it will be observed that the operator will have before him on the disk 34, a graphic record, giving information as to the number of missed explosions.

By observing the rotation of the ratchet wheel 32 in conjunction with a time piece, the number of revolutions per minute of the engine shaft may be ascertained readily.

It is to be observed that since the arm 43 of the angle lever 42 coacts with the arm or stop 39, the speed of rotation of the ratchet wheel 32 will be continuous whether the wheel be actuated by an explosion or by compression. The function of the back stop pawl 40 is to prevent a reverse rotation of the ratchet wheel 32. The spring 46 serves to tilt the arm 43 away from the member 39, so that the cam 35 may be positioned properly with respect to the part 20. The ports 12 serve to relieve the compression in the casing 10 when the plunger 17 is elevated.

Having thus described the invention, what is claimed is:—

1. In a device for indicating missed explosions in an internal combustion engine, a movable record carrier; a movable stylus carrier; a single explosion actuated and pressure actuated means for operating the record carrier and the stylus carrier simultaneously; and mechanism operatively connected with said means to render the same sluggishly responsive to compression, thereby to move the record carrier at a continuous speed but to produce an altered movement in the stylus carrier.

2. In a device for indicating missed explosions in an internal combustion engine, a movable record carrier; a movable stylus carrier; a single explosion actuated and pressure actuated means; a lost motion connection between said means and the stylus carrier, whereby the stylus carrier will be actuated by an explosion only; and mechanism for operatively connecting said means with the record carrier to actuate the same.

3. In a device for indicating missed explosions in an internal combustion engine, a movable record carrier; a movable stylus carrier; an explosion actuated and pressure actuated means; a lost motion connection between said means and the stylus carrier; an adjustable spring mechanism operatively connected with said means to regulate the movement thereof under compression; and mechanism for connecting said means operatively with the record carrier.

In testimony that I claim the foregoing as my own, I have hereto affixed my signature in the presence of two witnesses.

HORACE C. MORROW.

Witnesses:
 JERRY MORROW,
 C. E. LITTLER.